Dec. 27, 1949     K. H. WILLS     2,492,251
LEAD SCREW VARIATOR
Filed July 30, 1945     6 Sheets-Sheet 1
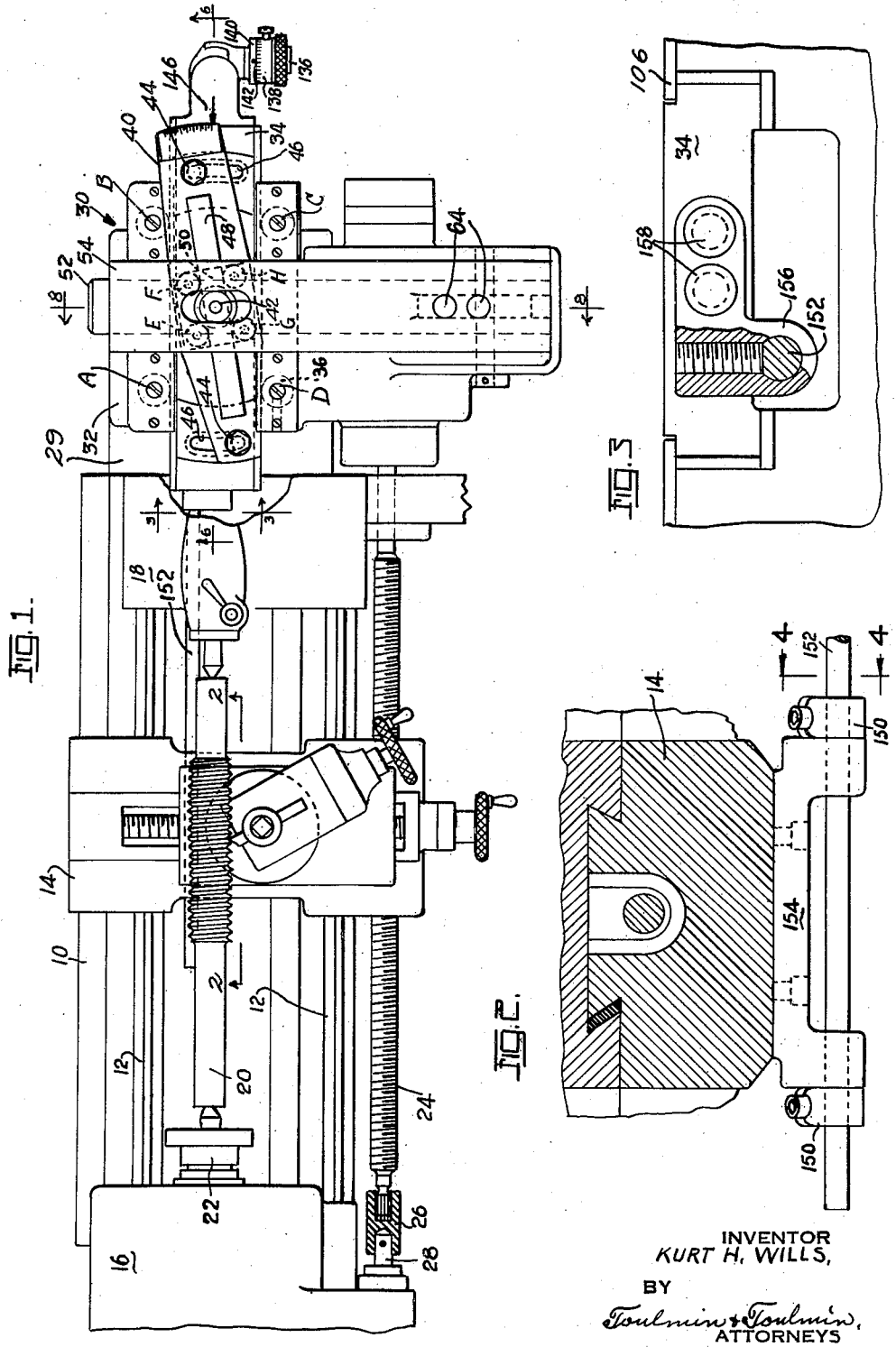
INVENTOR
*KURT H. WILLS,*
BY
*Toulmin & Toulmin,*
ATTORNEYS Dec. 27, 1949     K. H. WILLS     2,492,251
LEAD SCREW VARIATOR
Filed July 30, 1945     6 Sheets-Sheet 2
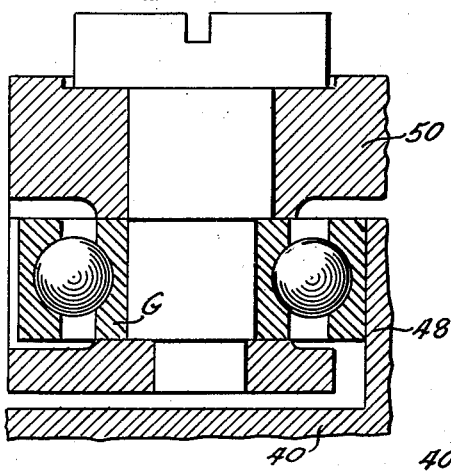
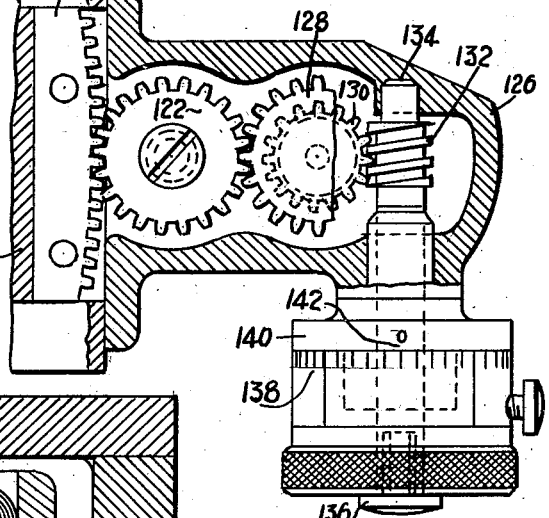
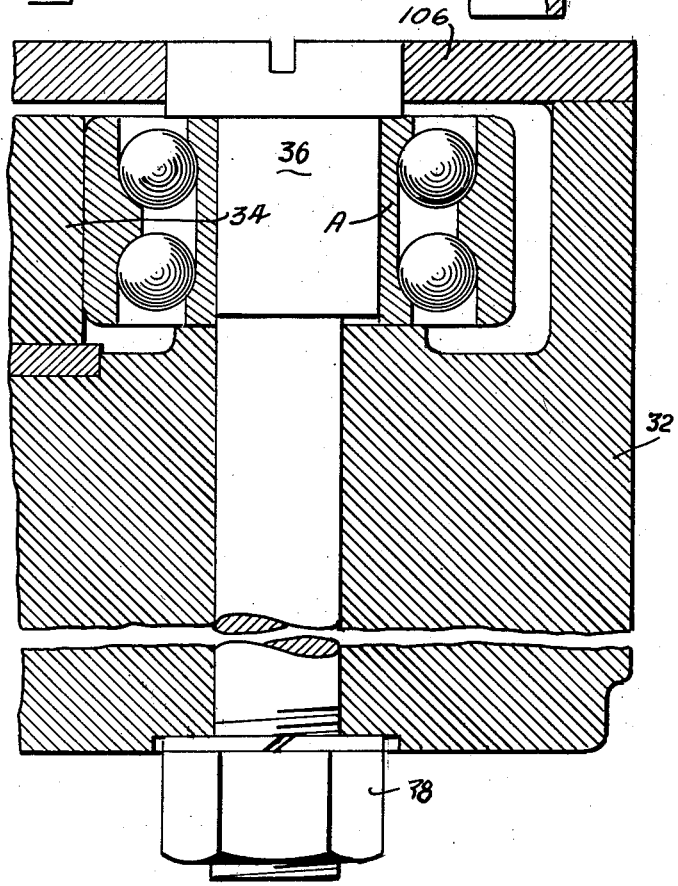
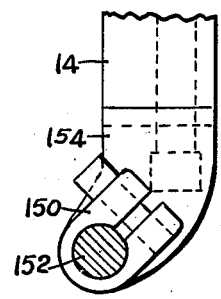
INVENTOR
KURT H. WILLS
BY Toulmin & Toulmin
ATTORNEYS Dec. 27, 1949 K. H. WILLS 2,492,251
LEAD SCREW VARIATOR
Filed July 30, 1945 6 Sheets-Sheet 3
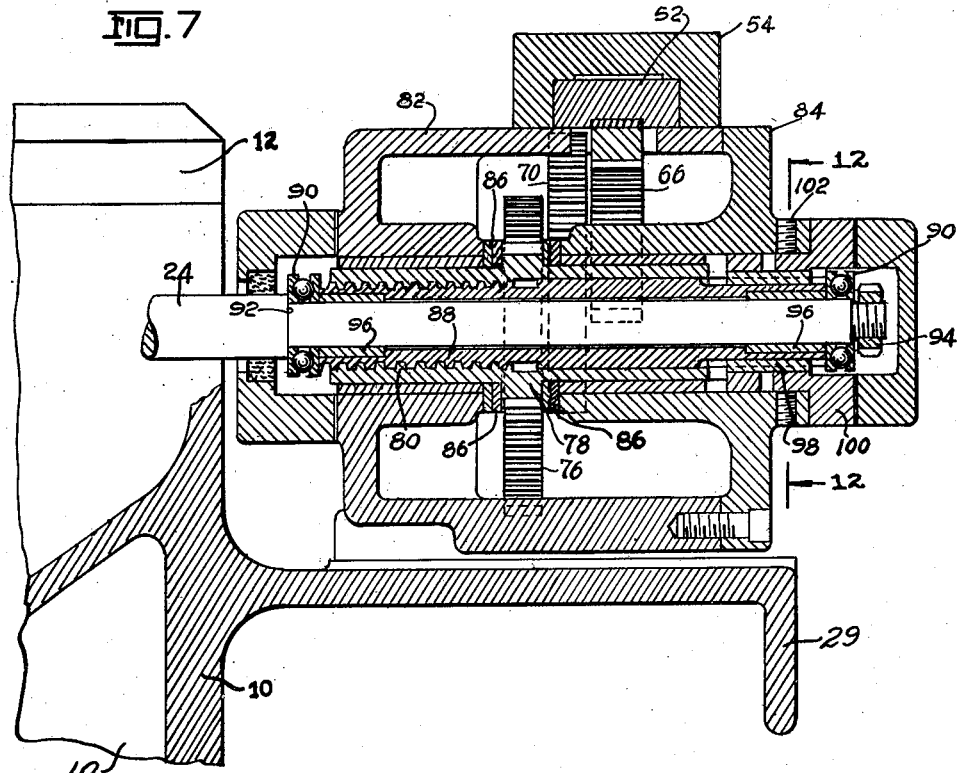
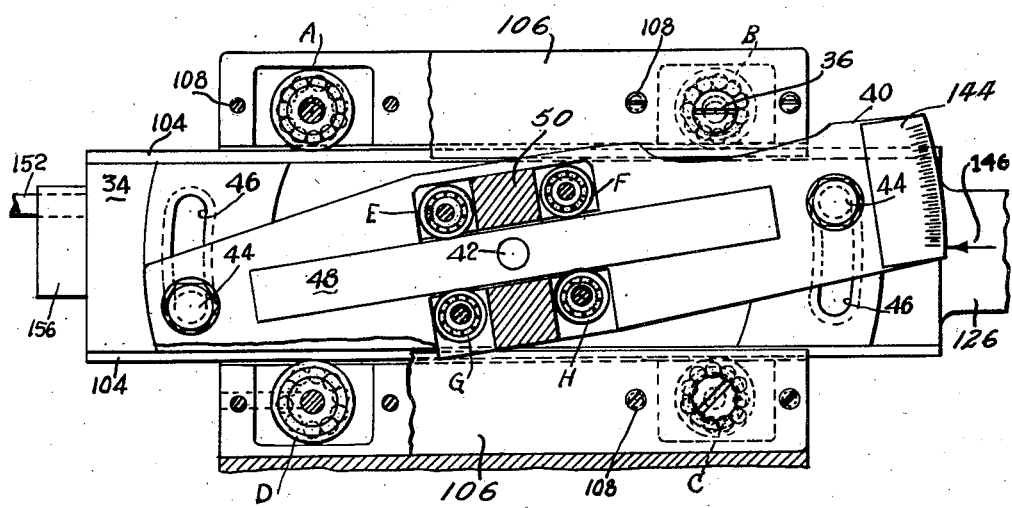
INVENTOR
KURT H. WILLS,
BY
Toulmin & Toulmin
ATTORNEYS

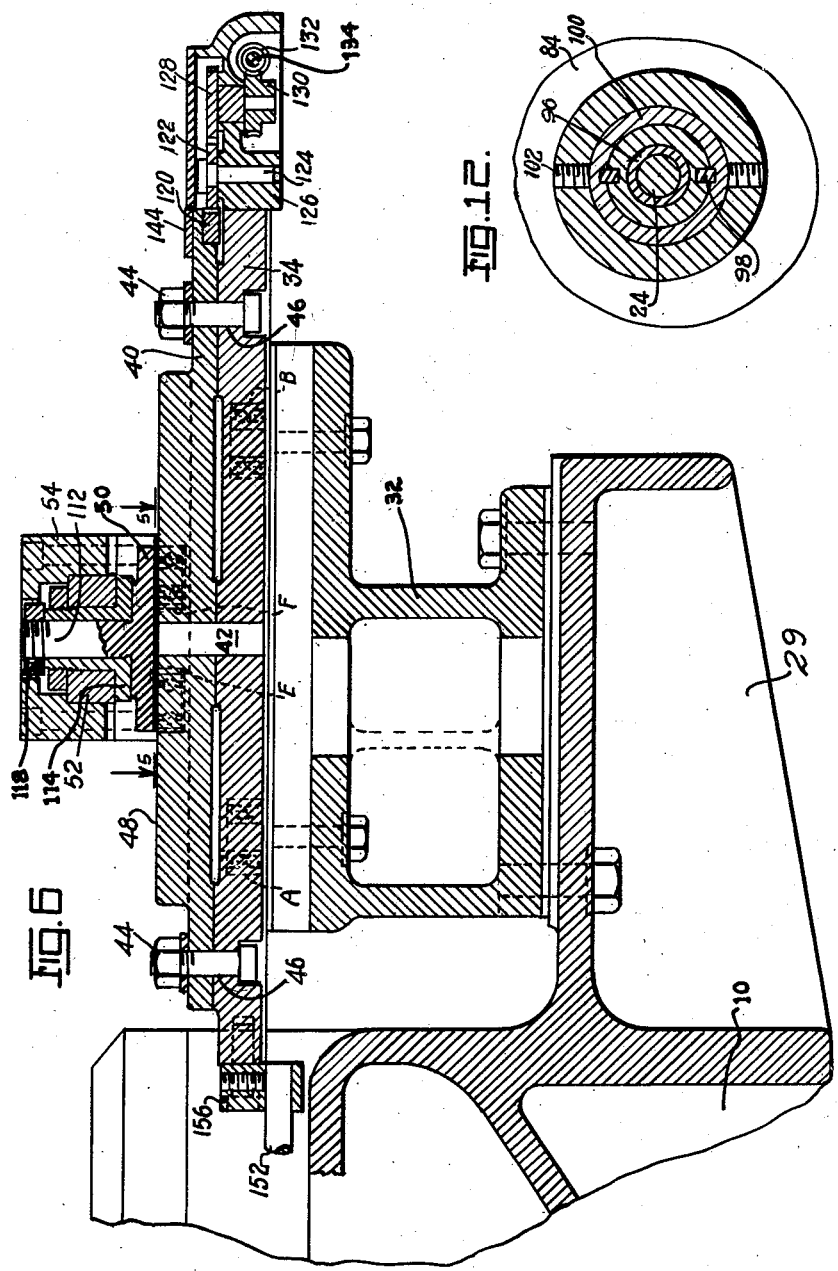

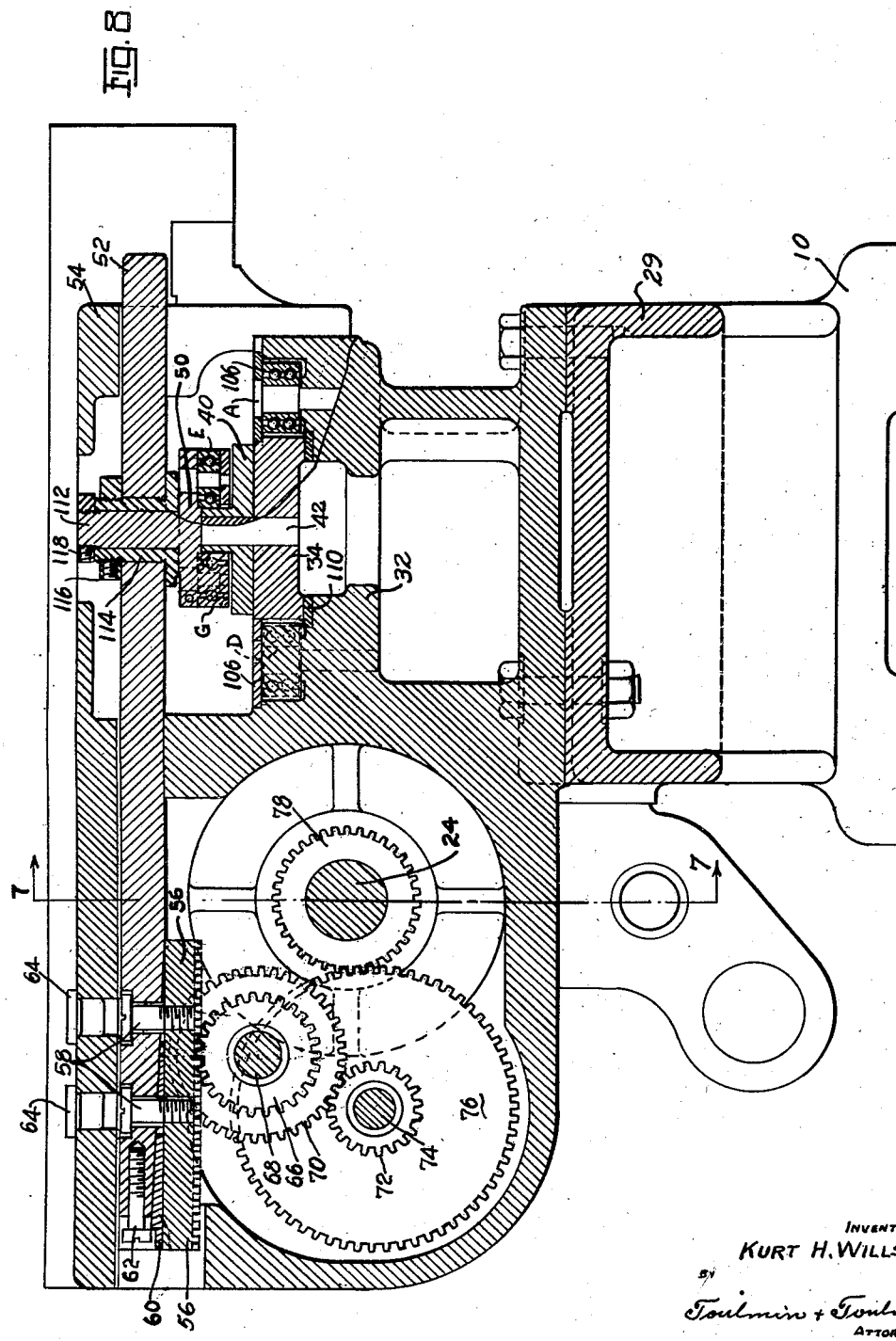

Dec. 27, 1949 K. H. WILLS 2,492,251
LEAD SCREW VARIATOR
Filed July 30, 1945 6 Sheets-Sheet 6
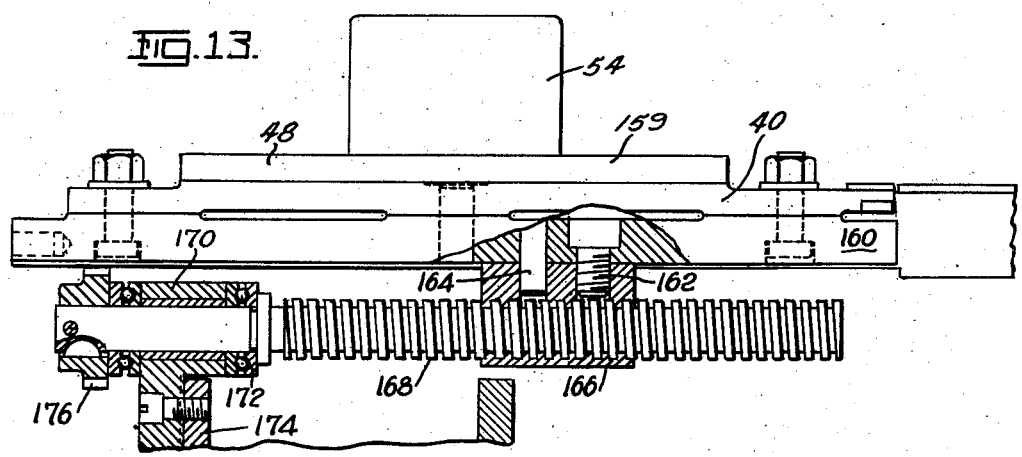
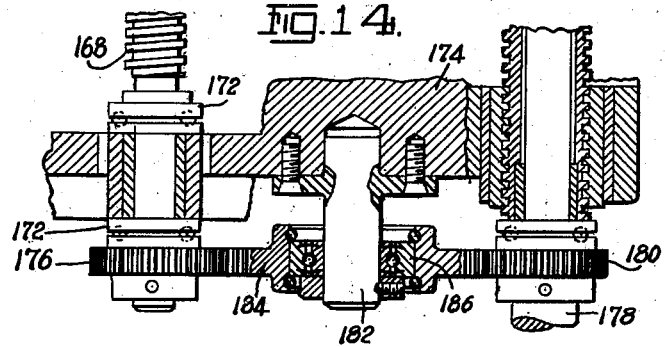
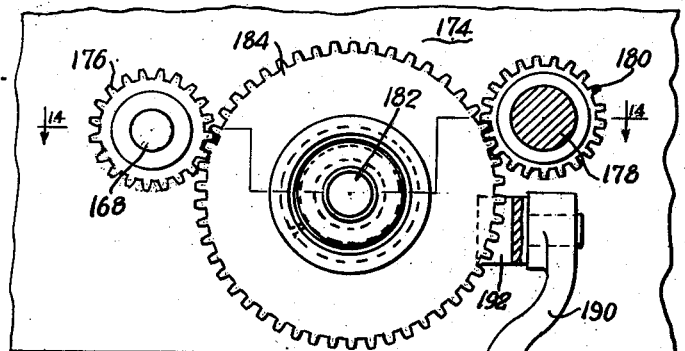
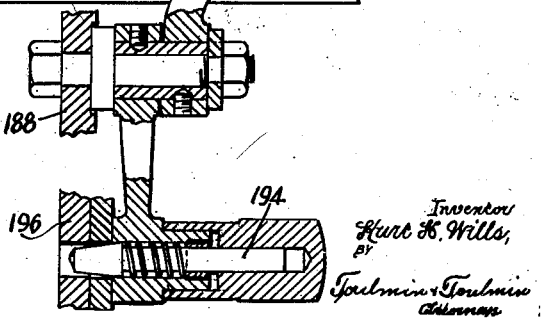
Inventor
Kurt H. Wills,
By
Toulmin & Toulmin
Attorneys Patented Dec. 27, 1949

2,492,251

UNITED STATES PATENT OFFICE 2,492,251

LEAD SCREW VARIATOR

Kurt H. Wills, Sidney, Ohio, assignor to The Monarch Machine Tool Co., Sidney, Ohio, a corporation of Ohio Application July 30, 1945, Serial No. 607,875

4 Claims. (Cl. 82—5)

This invention relates to machine tools, and particularly, to thread turning lathes.

It is a particular object of this invention to provide means in a thread turning lathe for infinitely varying the effective pitch of the lathe lead screw.

It is another object of this invention to provide means in connection with a thread turning lathe for axially shifting the lead screw during the turning of a thread so that the pitch of the thread may be varied as desired.

It is another object to provide a means for adjusting the effective pitch of a lathe lead screw which may be selectively adjusted to give any desired correction.

It is still another object to provide a mechanism according to the foregoing objects which may be made effective over any given portion of the travel of the lathe carriage.

These and other objects and advantages will become more apparent on reference to the following specification taken in connection with the accompanying drawings in which:

Figure 1 is a diagrammatic plan view of a lathe having a lead screw adjusting mechanism according to this invention;

Figure 2 is a cross section on line 2—2 of Figure 1 and shows the means for adjusting the mechanism relative to the lathe carriage;

Figure 3 is a cross section on line 3—3 of Figure 1 that shows the connecting means between the lathe carriage and the lead screw adjusting mechanism;

Figure 4 is a section on line 4—4 of Figure 2 and shows more in detail one of the clamping collars associated with the lathe carriage;

Figure 5 is a plan view partially broken away of a portion of the lead screw adjusting mechanism and shows more in detail the arrangement thereof;

Figure 6 is a vertical longitudinal section taken on the line 6—6 of Figure 1 showing construction details of the lead screw adjusting mechanism;

Figure 7 is a vertical section taken on the line 7—7 of Figure 8 and shows the gear train interconnecting the adjusting mechanism with the lead screw;

Figure 8 is a transverse vertical section on the line 8—8 of Figure 1;

Figures 9 and 10 are detailed sections showing an adjusting means for the guide bearings in the mechanism;

Figure 11 is a plan section showing the adjusting means used in connection with Figure 1;

Figure 12 is a section on the line 12—12 of Figure 7; and

Figures 13, 14 and 15 are views of a modified form of drive into the lead screw adjusting mechanism.

*General arrangement*

A lathe constructed according to this invention comprises, generally, a lathe bed having a headstock and tailstock between which a work piece is mounted to be driven by the headstock spindle.

A carriage is provided which mounts a cutting tool and which is reciprocated longitudinally of the work piece by a lead screw. The lead screw is geared to the headstock spindle through any appropriate arrangement including change gears so that a predetermined speed ratio may be established between the said spindle and the said lead screw.

According to my invention means are provided for infinitely varying the speed ratios between the spindle and lead screw so that a thread having any predetermined pitch may be cut. This mechanism comprises means for varying the effective pitch of the lead screw as it drives the carriage longitudinally of the work piece.

In general, the adjusting means comprises a first member movable with the carriage and a second member movable transversely to the first member. An adjustable inclined plane interconnects the first and second member so that any amount of movement is given the second as the first moves relative thereto.

The movement of the second member is translated through a suitable gear train to a nut which engages a threaded sleeve carried by the lead screw. The lead screw is secured to the sleeve and is driven from the headstock through a splined connection so that as the said nut and sleeve are relatively rotated the lead screw is given a predetermined amount of axial shift.

This is effective continuously to vary the effective pitch of the lead screw as the carriage moves along the work.

Means comprising a graduated handwheel are provided for adjusting the aforementioned inclined plane so that any predetermined adjustment may be given the lead screw during the travel of the carriage. Other means are provided for causing the mechanism to be effective over any predetermined portion of the travel of the said carriage.

The aforementioned first and second members include anti-friction bearings, preferably ball bearings, a portion of which are mounted on eccentric pins so that they may be adjusted very precisely to guide the said first and second movable members. Thus, precise adjustment of the lead screw is obtained so that screws and threads having odd or fractional pitches may be cut to the desired degree of accuracy.

The particular use contemplated for my invention is that of forming the threaded portions of dies and molds in which is desired to form work pieces which, when ejected from the mold and cooled, will have threads of standard pitch. By knowing the characteristics of the molding material, it is possible very precisely to add or subtract a predetermined percentage of pitch from the thread in the mold part corresponding with the percentage of shrinkage or expansion of the work piece. However, it will be apparent that my invention is also useful in many other instances where it is desired to cut grooves or threads having a pitch different from that provided for in the lathe gearing.

Structural arrangement

Referring to the drawings, there is illustrated in Figure 1 a lathe comprising a bed 10 having the usual ways 12 thereon for guiding a carriage 14 longitudinally of the said bed.

The bed 10 mounts a headstock 16 and a tailstock 18 between which is supported a work piece 20 to be driven by the lathe spindle 22 in any customary manner. The lathe also comprises a lead screw 24 which is connected by a splined connecter 26 and a shaft 28 through a gear box and change gearing with the geared lathe headstock 16. By the usual change gear arrangements within the gear box a number of predetermined speed ratios between the spindle 22 and the lead screw 24 may be established. According to the usual practice, only a certain number of these ratios are available so that the turning of special threads generally requires the use of special change gears.

Fastened to the right end of the lathe bed 10 on a platform 29 is a mechanism generally indicated at 30 which is for the purpose of axially shifting the lead screw 24 during the operation of the lathe. The mechanism at 30 comprises a stationary bed 32 which slidably receives a plate 34 between the ball bearings A, B, C and D. The bearings A, B and C are supported on eccentric screws 36 which pass through the bed member 32 and are locked in place by nuts 38, Figure 10. The eccentric screws 36 provide a means whereby the plate 34 may be adjusted to move in exact parallelism with the carriage 14 while being exactly guided between the said ball bearings so that there is no side motion to the said plate. The fourth ball bearing at D is generally fixedly carried on a pin which is locked in the bed 32.

The plate 34 carries a second plate 40 which is pivoted on the pin 42 at the center of the plate 34. The plate 40 is angularly adjustable about the pin 42 and may be locked in any position of adjustment by bolts 44 which extend into the slots 46. The plate 40 comprises an upstanding rib 48 which is adapted for being received between the ball bearings E, F, G and H.

The ball bearings E, F, G and H are carried by a substantially rectangular plate 50 which is pivotally secured to a transverse bar 52. The transverse bar 52 is guided in a housing 54 which is secured to the bed portion 32 in any suitable manner. The location of the housing 54 is such that it does not interfere with the free movement of the plates 34 and 40.

The member 52 extends leftwardly (Figure 8) and has secured to the left end thereof a rack 56 by the bolts 58. Disposed between the end of the member 52 and the rack 56 is a tapered gib 60 which is adjustable relative to the said member and rack by means of the screw 62. The plugs 64 provide a means of access to the bolts 58 so they may be loosened to permit the adjustment of the gib 60. The purpose of the gib 60 is to take up for wear and prevent any lost motion between the rack 56 and the gear 66 which meshes with it. The gear 66 is rotatably mounted on a stud 68 and has integral therewith the gear 70 which meshes with a gear 72. The gear 72 is rotatable on a supporting shaft 74 and has integral therewith a gear 76 which meshes with a gear 78. The gear 78 (Figure 7) is integral with a structure which comprises tubular portions which extend oppositely away from said gear and one which is internally threaded as at 80. The tubular portions are supported in journalled apertures in the housing portions 82 and 84 which are secured together in any suitable manner. Longitudinal movement of the gear 78 and the tubular portion integral therewith is prevented by the wear plates 86 disposed between said gear and the housing portions 82 and 84.

Threadedly received within the nut 80 is a screw 88 which is hollow and which abuts at either end the ball thrust bearings 90. The left-hand thrust bearing abuts a shoulder 92 on the lead screw 24 while the right hand bearing 90 is abutted by the nut and washer arrangement at 94 and carried by the threaded end of the lead screw. The screw 88 is further supported by the radial bearings 96 at either end so that it is fixedly but rotatably held in position relative to the lead screw. Rotation of the screw 88 is prevented by the splined connection thereof at 98 with the sleeve 100. The sleeve 100 is carried in an aperture in the right end of the housing 84 and is held against rotation by the screws 102.

It will be apparent that transverse movement of the member 52 will be effective through the rack 56 and the gear train associated therewith to rotate the nut 80 thereby axially to shift the screw 88 and with it the lead screw 24.

Referring to Figures 5 and 8, the manner of guiding and supporting the plate 34 is more particularly shown. The plate 34 comprises ledges 104 on either side thereof which are adapted for being received under the projecting plates 106 on either side of the plate 34. The plates 106 are secured to the bed 32 by the screws 108 and are apertured to receive the ends of the eccentric screws 36. The plate 34 is vertically supported on the wear plates 110 positioned in suitable shaped recesses in the bed 32 beneath the said plate 34.

Referring to Figures 6 and 8, the means for supporting the plate 50 in the member 52 is more particularly shown. The plate 50 comprises an upstanding portion 112 which is closely received within a shouldered bushing 114, the shoulder of which lies between the member 52 and the plate 50. A nut 116 secures the bushing 114 in the proper relationship relative to the member 52 while the nut 118 secures the member 50 and portion 112 thereof in proper relationship to the said bushing. The plate 50 is thus accurately rotatably supported by the member 52.

Referring to Figures 6 and 11, a means for angularly adjusting the plate 40 relative to the plate 34 will be seen to comprise a rack 120 secured to the end of the plate 40 and adapted for meshing with a spur gear 122 which is rotatably mounted on the pin 124 and the block 126.

The block 126 is secured to the end of the plate 34 by any suitable means such as screws, not shown, and forms a housing for a gear 128 which meshes with the gear 122. The gear 128 has attached thereto the worm gear 130 which is engaged by the worm 132. The worm 132 is carried on a shaft 134 which projects outwardly of the casing 126 and has secured thereto the graduated handwheel 136. The graduated handwheel 136 has the dial 138 thereon, while the member 140 secured to the housing 126 has an index mark 142 adapted for registration with the said dial.

The plate 40 also carries a dial plate 144 which is adapted for registration with the index mark 146 which is carried on the cover of the housing 126. By loosening the bolts 44, the handwheel 136 may be actuated to drive the rack 120 angularly to move the said plate 40 in any predetermined position of adjustment. The precise amount of adjustment may be indicated on the dials 144 and 138 and the bolts 44 tightened when the plate is in the desired position.

Operation

In operation, the work piece 20 is mounted in the lathe with the carriage and cross slide initially positioned at the beginning of the cut. The gears in the lathe headstock are adjusted so as to drive the lead screw 24 at the nearest speed to that required for cutting the necessary thread. Thereafter, the plate 40 is adjusted so as axially to shift the lead screw during the movement of the carriage in order to add to or subtract from the movement of the carriage thereby exactly to cut the necessary thread. In order to permit the carriage 14 to be initially positioned, there are provided the collars 150 on the rod 152 (Figures 2 and 4) which abut either side of a bracket 154 carried on the under side of the carriage 14. The collars 150 may be loosened so that relative adjustment of the carriage and the rod 152 may be made before putting the lathe in operation.

The rod 152 is connected to a bracket 156 (Figure 6) which is secured to the end of plate 34 by the bolts 158 so that when the collars 150 are locked against the bracket 154, the carriage 14 and plate 34 move as an integral unit.

When the feed rod 24 is driven in the conventional manner from the lathe gear box it longitudinally drives the carriage 14 in the customary manner. Since the rod 152 is directly connected to the carriage 14 by the bracket 154 and collars 150 this rod 152 also reciprocates as a unit with the carriage 14. Reciprocation of the rod 152 by means of the bracket 156 reciprocates the plate 34. With the pivoted plate 40 at an angle to the plate 34 the upstanding rib 48 transmits through the bearings E, F, G and H a transverse movement to the member 52. This transverse movement through the rack 46 and gear train 66—78 rotates the nut 80. Rotation of the nut 80 through the screw 88 and thrust bearings 90 causes an axial shifting of the lead screw 24. This slight axial shifting is permitted by the splined connection 26. Thus, it will be seen that with the slight axial shifting of the lead screw 24 the effective pitch of the thread of this lead screw 24 is changed. Such change may be very slight— a fraction of one per cent if desired in order to account for shrinkage in a material which is to be molded in the threaded mold.

Modification of Figures 13, 14 and 15

In Figures 13, 14 and 15 there is shown a modified arrangement 159 for driving the reciprocating table of the lead screw adjusting mechanism. This modified lead screw adjusting mechanism 159 replaces the original screw adjusting mechanism 30. The Figure 13 is a view similar to that shown in Figure 6. In these views, the plate 160 is a substitute for the plate 34 of the preferred embodiment. This plate 160 carries the plate 40 having the upstanding rib 48 which is adapted to be angularly positioned relative to the direction of translation of the plate 160 and thus provide a transverse movement as in the preferred embodiment. The plate 160 has connected therewith, by the screw 162 and dowel 164, a nut 166 which is engaged by a screw 168 journaled in block 170. The thrust bearings 172 retain the screw 168 against axial movement relative to the bed 174 and the gear 176 provides means for driving the said screw in rotation. The bed 174 is adapted to be fastened to the right end of the lathe in any suitable manner, and is the equivalent of the bed 32 of the preferred embodiment.

In Figure 14 it will be noted that the lathe lead screw 178 carries a gear 180 and that the bed 174 carries a stub shaft 182 that supports a gear 184. The gear 184 is mounted on an anti-friction bearing 186 that is slidable on the stub shaft 182 so that the gear 184 may be selectively positioned to drivingly interconnect the gears 176 and 180 or to disconnect the said gears.

Pivotally mounted at 188 is a lever 190 which comprises slotted shoe 192 engaging the periphery of the gear 184 for shifting the gear as mentioned above.

The end of the lever opposite the shoe has a spring pressed plunger 194 adapted for engagement with spaced holes in a plate 196 so that the lever 190 and, therefore, the gear 184 may be selectively locked in a first position drivingly to interconnect the gears 176 and 180 or, in a second position to disconnect the said gears. Thus, this modification of Figures 13, 14 and 15 provides for translation of the plate 160 (the equivalent of plate 34), by a gear train from the lead screw 178 rather than by direct coupling to the carriage 14. The rod 152, collars 150, and brackets 154 and 156 thus are eliminated in this modification.

While it is preferable that the pitch of the screw 168 and the size of the gear 176 be apportioned to the pitch of the lathe lead screw 178 and the gear 180 keyed thereto so that the plate 160 and the lathe carriage move together, it is not intended that this invention be limited to that particular arrangement.

In machine shop and tool room practice, it is often desired to form a thread whose pitch is a predetermined per cent different from a standard pitch. This occasion would arise, for example, in the forming of threaded parts for molds to be used for plastic molding and similar operations. In this case, the present invention permits the thread to be formed on the mold part with a predetermined amount allowed for shrinkage or expansion so that work pieces made in the molds will, when completed, have threads therein of the proper pitch.

It will be evident that this invention is also useful for forming threads having a pitch different from that provided for in the headstock change gearing. Thus, a lathe may be constructed which has a substantially greater range than has heretofore been possible and the utility of the machine is therefore enhanced without the necessity of providing a great quantity of change gears.

It will also be evident that while the work piece shown has an external thread thereon, this device is equally adapted for turning internal threads, the only difference being in the location of the cutting tool relative to the work.

Also, while the drawings illustrate the preferred embodiment of my invention, it will be understood that various changes can be made therein without departing from the spirit of this disclosure. For example, although it is preferable to carry the ball bearings A, B, C and D in the bed 32, they could as well be carried by the plate 34 without involving any departure from this invention. Other inversions of the device will be apparent to those skilled in the art and it is intended that these modified arrangements shall be considered to come within the spirit of this disclosure.

Accordingly, it is desired to comprehend such modifications as may be considered to come within the scope of the appended claims.

I claim:

1. In a machine tool, a carriage, a lead screw for actuating said carriage, splined means for driving said lead screw in rotation while permitting axial movement thereof, a first threaded member rotatable on said lead screw, abutment means for preventing relative axial movement of said lead screw and said first member, a second threaded member for engaging said first threaded member whereby relative rotation of said members is operable axially to shift said lead screw, a first plate adapted for movement parallel to said carriage, means interconnecting said carriage and said plate for causing simultaneous movement thereof, a second plate pivotally secured to said first plate comprising an upstanding rib, means for adjusting said plates to any predetermined angularity, a bar movable in a path which intersects the path of said plates, means carried by said bar for engaging said rib on either side thereof, a rack carried by said bar, and gearing interconnecting said rack and one of said threaded members whereby movement of said carriage is adapted for axially shifting said lead screw at a predetermined rate thereby to modify the movement of said carriage.

2. In a machine tool, a carriage, a lead screw, splined means for driving said lead screw for actuating said carriage, a first threaded member mounted on said lead screw so as to permit relative rotation while preventing relative axial movement of said member and said lead screw, a second threaded member for engaging said first threaded member whereby relative rotation of said members is operable axially to shift said lead screw, a first plate, guide means for guiding said plate in a path parallel to said carriage, an adjustable draw bar interconnecting said carriage and said plate, a second plate carried by said first plate adjustable to any predetermined angularity and comprising an upstanding rib, a bar constrained to move in a path which is transverse to the path of said plate, means pivotally secured to said bar comprising anti-friction bearings for engaging said rib on either side thereof, and gearing interconnecting said bar with one of said threaded members whereby movement of said carriage is operable axially to shift said lead screw thereby to modify the rate of movement of said carriage.

3. In a machine tool, a carriage, a lead screw, splined driving means for said lead screw, a hollow screw mounted on said lead screw, abutment means for preventing relative axial movement of said hollow screw and said lead screw, stationary means splined to said hollow screw for preventing rotation thereof, a nut threadedly engaged with said hollow screw, a plate connected with said carriage for movement therewith, guiding means engaging either edge of said plate for guiding the same in a path parallel with that of said carriage, a member comprising an upstanding rib pivotally mounted on said plate and adjustable to any predetermined angularity therewith, a bar movable substantially at right angles to said plate, a block pivoted to said bar and comprising anti-friction bearings adapted for engaging said rib on either side thereof, a rack connected with said bar, and a gear train interconnecting said rack with said nut whereby movement of said carriage is effective axially to shift said lead screw thereby to vary the effective pitch thereof.

4. In a machine tool, a carriage, a lead screw, splined driving means for said lead screw, a hollow screw mounted on said lead screw, abutment means for preventing relative axial movement of said hollow screw and said lead screw, stationary means splined to said hollow screw for preventing rotation thereof, a nut threadedly engaged with said hollow screw, a plate connected with said carriage for movement therewith, a stationary frame for reciprocably receiving said plate, a plurality of anti-friction bearings carried by said frame adapted for engaging either edge of said plate, said bearings being movable to adjust the path of said plate into precise parallelism with the path of said carriage, a member comprising an upstanding rib pivotally mounted on said plate and adjustable to any predetermined angularity therewith, a bar movable substantially at right angles to said plate, a block pivoted to said bar and comprising anti-friction bearings adapted for engaging said rib on either side thereof, a rack connected with said bar, and a gear train interconnecting said rack with said nut whereby movement of said carriage is effective axially to shift said lead screw thereby to vary the effective pitch thereof.

KURT H. WILLS.

REFERENCES CITED

The following references are of record in the file of this patent:

UNITED STATES PATENTS

| Number | Name | Date |
|---|---|---|
| 1,347,789 | Muller | July 27, 1920 |
| 1,976,476 | Breitenstein | Oct. 9, 1934 |
| 2,184,377 | Bickel | Dec. 26, 1939 |
| 2,231,000 | Drissner | Feb. 11, 1941 |